(12) United States Patent
Frankel et al.

(10) Patent No.: US 9,791,101 B1
(45) Date of Patent: Oct. 17, 2017

(54) POSITIONING FIXTURE WITH A CONNECTING ROD

(71) Applicant: Zenithen USA LLC, Upland, CA (US)

(72) Inventors: Andrew David Frankel, Yorba Linda, CA (US); Shi-Ping Zheng, Fuzhou (CN); Tian-Xia Zheng, Fujian (CN)

(73) Assignee: Zenithen USA, LLC, Diamond Bar, CA (US)

( * ) Notice: Subject to any disclaimer, the term of this patent is extended or adjusted under 35 U.S.C. 154(b) by 0 days.

(21) Appl. No.: 15/435,669

(22) Filed: Feb. 17, 2017

(51) Int. Cl.
| | | |
|---|---|---|
| *F16M 13/02* | (2006.01) | |
| *F16C 11/04* | (2006.01) | |
| *F16B 2/12* | (2006.01) | |
| *A47D 13/04* | (2006.01) | |
| *A45B 17/00* | (2006.01) | |
| *A45B 23/00* | (2006.01) | |
| *A47C 7/58* | (2006.01) | |
| *A47C 1/14* | (2006.01) | |

(52) U.S. Cl.
CPC .......... *F16M 13/022* (2013.01); *A45B 17/00* (2013.01); *A45B 23/00* (2013.01); *A47C 7/58* (2013.01); *A47D 13/04* (2013.01); *F16B 2/12* (2013.01); *F16C 11/04* (2013.01)

(58) Field of Classification Search
CPC .............. F16M 13/022; F16M 11/043; F16M 2200/025; F16C 11/04; F16C 7/00; F15B 2/12; E04H 12/22; A45B 17/00; A45B 23/00; A47C 1/14; A47D 13/04; A45F 3/44

USPC ... 248/231.41, 213.51, 222.14, 228.6, 230.6, 248/237.1
See application file for complete search history.

(56) References Cited

U.S. PATENT DOCUMENTS

| | | | | | |
|---|---|---|---|---|---|
| 713,189 | A | * | 11/1902 | Yates | ...................... B25B 5/142 269/250 |
| 1,525,515 | A | * | 2/1925 | Socha | .................... B60R 13/00 248/514 |
| 2,480,415 | A | * | 8/1949 | Mettler | ................... B25B 1/103 269/251 |
| 2,886,268 | A | * | 5/1959 | Ahrens, Jr. | ........... A01K 91/08 248/278.1 |
| 4,443,837 | A | * | 4/1984 | Migliori | .............. F16M 11/043 362/16 |
| 5,320,322 | A | * | 6/1994 | Williams | ................. G09F 7/18 116/173 |
| 6,152,435 | A | * | 11/2000 | Snell | ..................... B25B 1/2452 269/268 |
| 6,230,724 | B1 | * | 5/2001 | Lai | ........................ A45B 17/00 135/20.3 |

(Continued)

*Primary Examiner* — Muhammad Ijaz
*Assistant Examiner* — Bonnie Lau
(74) *Attorney, Agent, or Firm* — Merek, Blackmon & Voorhees, LLC

(57) ABSTRACT

A type of positioning fixture with a connecting rod, consisting of a fixed clamping seat, a movable collet, a bolt and a connecting rod; the fixed clamping seat consists of a bolt seat, a fixed collet and a stroke plate; the bolt is engaged by threading it with the bolt seat; the end of the bolt is positioned with the movable collet. The connecting rod is movably riveted to the movable collet by a rivet and is provided with a dowel pin at the end; the stroke plate on the fixed clamping seat is provided with a wavy slot; the dowel pin on the connecting rod is inserted into the wavy slot to form the two-point positioning of the connecting rod.

7 Claims, 3 Drawing Sheets

(56) References Cited

U.S. PATENT DOCUMENTS

| | | | | |
|---|---|---|---|---|
| 6,305,394 B1* | 10/2001 | Reese | A45B 11/00 | |
| | | | 135/20.1 | |
| 6,330,898 B1* | 12/2001 | Chang | B62B 9/145 | |
| | | | 160/24 | |
| 6,342,138 B1* | 1/2002 | Brown | C25D 17/06 | |
| | | | 204/297.01 | |
| 6,640,666 B2* | 11/2003 | Pliley | B25B 1/2405 | |
| | | | 269/283 | |
| 6,898,893 B1* | 5/2005 | Mukdaprakorn | A01K 97/10 | |
| | | | 248/518 | |
| 9,476,541 B1* | 10/2016 | Kastner | F16M 13/02 | |
| 2003/0122045 A1* | 7/2003 | Mulford | A01M 31/02 | |
| | | | 248/231.71 | |
| 2008/0035049 A1* | 2/2008 | Johnston | G09F 17/00 | |
| | | | 116/173 | |
| 2008/0265110 A1* | 10/2008 | Helmonds | A45F 3/44 | |
| | | | 248/156 | |
| 2009/0014986 A1* | 1/2009 | Chen | B62B 7/123 | |
| | | | 280/658 | |
| 2010/0252711 A1* | 10/2010 | Buchner | E04H 12/2269 | |
| | | | 248/539 | |
| 2014/0231605 A1* | 8/2014 | Sharpe | F16M 11/041 | |
| | | | 248/222.13 | |

\* cited by examiner

POSITIONING FIXTURE WITH A CONNECTING ROD

BACKGROUND OF THE INVENTION

Field of the Invention

The invention is in the field of positioning fixtures with connecting rods. Specifically, it is a type of fixture with a connecting rod whose angle adjustment can simultaneously achieve the positioning of the fixture.

Technical Background

China Patent Gazette published an application, No. 201020126581.0, entitled "a secure fixture with a connecting rod." This fixture comprises a collet and a connecting rod, and the posterior end of the connecting rod conveniently connects with other objects; the collet is connected with the connecting rod through a direction adjusting device to form a rotatable connection. At least one section of the connecting rod is a plastic bendable rod; the plastic bendable rod comprises an inner core composed of multiple strands of iron wire and a plastic outer layer wrapped around the inner core by injection molding to achieve the purpose of bending the connecting rod. The design makes sense in some aspects, such as the use of a bendable rod as part of the connecting rod to achieve an adjustment function that allows any angle. However, it still requires the presence of a direction adjustment device between the connecting rod and the collet, resulting in a two-step action when assembled together on-site, that is, the adjusting of the collet such that it locks on the object, and then the adjusting of the angle of the connecting rod. This is relatively troublesome solution.

Therefore, to provide a design in which the connection rod angle adjustment and fixture positioning can be simultaneously achieved is the object of this invention.

SUMMARY OF THE INVENTION

The object of this invention is to design a positioning fixture with a connecting rod that can simultaneously achieve the angular position of the connecting rod and the clamping position of the fixture.

The technical portion of this invention is realized in the following way:

The main body of the fixed clamping seat is formed by punching a steel plate with enforcing ribs. A polygonal hole is punched out in the bolt seat. The polygonal hole is outfitted with a plastic part that has a polygonal boss and an internally threaded hole penetrating the polygonal boss. With the polygonal boss, this plastic part is embedded in the polygonal hole to form a rotation limit. The plastic part and the bolt seat are solidly riveted with a rivet.

The fixed collet features a mounting hole corresponding to the polygonal hole in the bolt seat.

The positioning hole between the movable collet and the bolt end part is an elongated slotted hole which is longer than the width of the wavy slot; a long screw with a washer passes through the elongated slotted hole and is locked at the end of the bolt to form a movable positioning structure.

The invention is characterized by the way the clamping position of the fixture is achieved when clamping an object, as well as in how the positioning of the angle of the connecting rod is realized. With one action, we realize two results, which simplifies the operation of the device. In addition, the connecting rod angle is well-supported, providing greater supporting torsion properties. This invention can be widely used in, for example, supporting sunshades/beach umbrellas for beach chairs or strollers as well as for some temporary support purposes.

BRIEF DESCRIPTION OF THE DRAWINGS

Similar reference characters denote corresponding features consistently throughout the attached drawings. Namely, in the drawings the following reference numbers refer to the following part.

1—fixed clamping seat
11—bolt seat
110—polygonal hole
12—fixed collet
120—mounting hole
13—stroke plate
130—wavy slot
14—enforcing rib
15—plastic part
151—polygonal boss
152—internally threaded hole
2—movable collet
20—elongated slotted hole
3—bolt
31—bolt head
32—long screw
4—connecting rod
41—dowel pin
411—washer
5—rivet

DETAILED DESCRIPTION OF THE PREFERRED EMBODIMENT(S)

Figure 1:
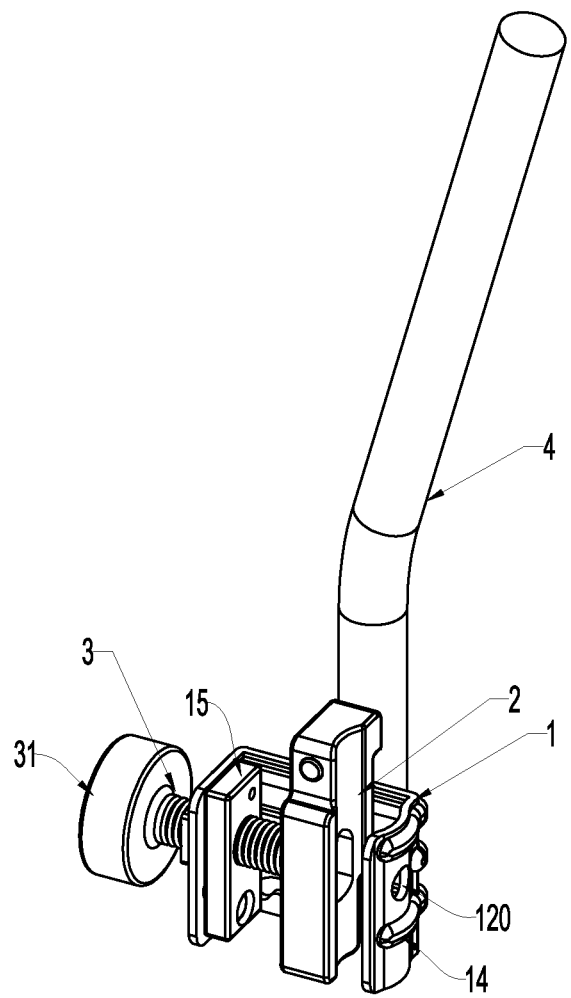
FIG. 1 shows a schematic of a positioning fixture with a connecting rod.
Figure 2:
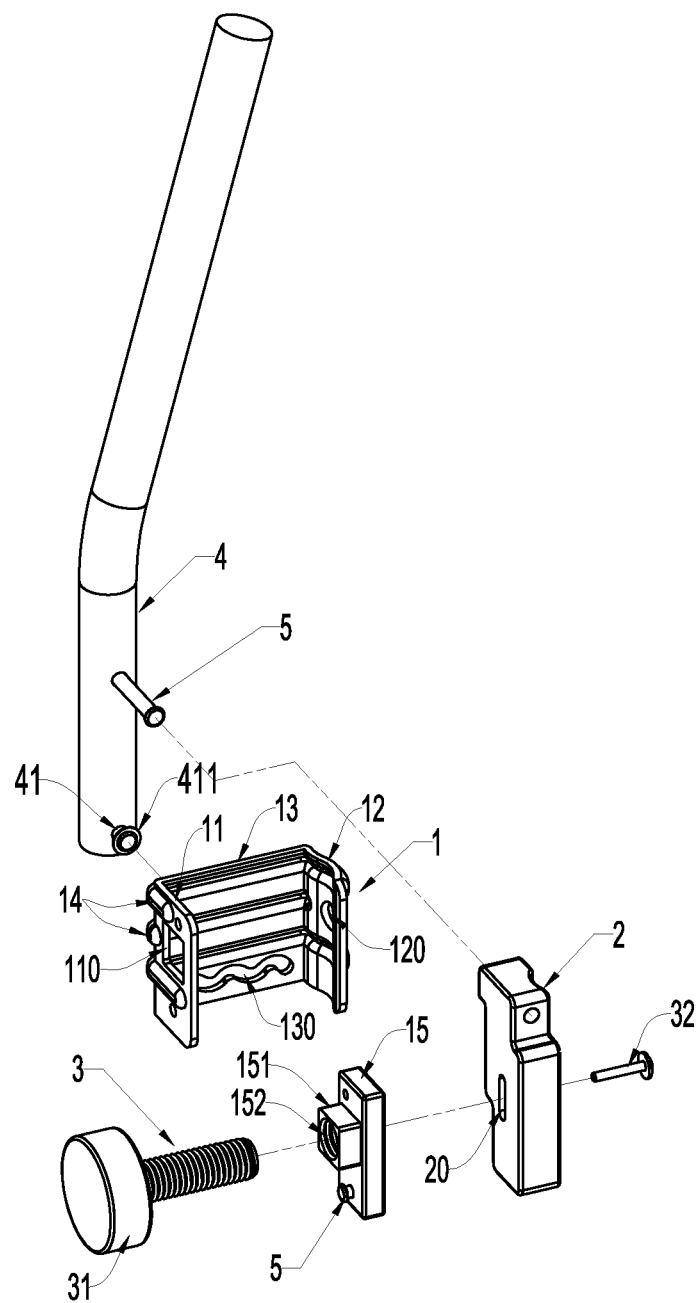
FIG. 2 shows an exploded breakdown of the positioning fixture with a connecting rod.

Referring to FIG. 1 and FIG. 2, the positioning fixture with a connecting rod includes the fixed clamping seat 1, the movable collet 2, the bolt 3 and the connecting rod 4.

The fixed clamping seat 1 is in the shape of a "⊏," (i.e., U-shaped) consisting of the bolt seat 11, the fixed collet 12 and the stroke plate 13. Preferably, the main body of the fixed clamping seat 1 is punched by a steel plate with the enforcing ribs 14. A polygonal hole 110 is punched out in the bolt seat 11; the fixed collet 12 features the mounting hole 120 corresponding to the position of the polygonal hole. The polygonal hole 110 is provided with the plastic part 15. The plastic part is provided with the polygonal boss 151 and the internally threaded hole 152 penetrating the polygonal hole. With the polygonal boss 151, the plastic part is embedded in the polygonal opening ("hole") 110 (e.g., square, hexagonal, octagonal, etc.) to form a rotation limit. The plastic part 15 and the bolt seat 11 are riveted with a rivet. The cooperation between the steel plate and the plastic part 15 allows the main body of the fixed clamping seat 1 to be relatively thin and highly resilient. The plastic part 15 features the convenience of an internally threaded hole 152 and has relatively good material damping properties, maintaining the tightness of the lock and preventing loosening. The stroke plate 13 is provided with a wavy ("sinusoidal" or "wavelike") slot 130. For the purposes of this application, a "wavy slot" shall be defined as an elongated opening having a number of alternating curves in a sinusoidal, wavy or wavelike contour along the length of the opening. The purpose of the above mentioned polygonal hole 110 in the bolt seat 11 and the polygonal boss 151 in the plastic part is to prevent rotation. Any non-circular opening would work, but a rectangular hole and a rectangular boss are preferable.

The bolt 3 is provided at one end with the manually operable bolt head 31. The bolt 3 is engaged by threading it to the bolt seat 11, that is, it can be screwed into the internally threaded hole 152 in the plastic part 15. The end of the bolt is positioned with the movable collet 2. The bolt 3 drives the movable collet 2 closer to the fixed collet 12 to generate a tight clamping action. More specifically, the positioning hole of the movable collet 2 and the end of the bolt 3 is the elongated slotted hole 20 which is longer than the width of the wavy slot 130 on the stroke plate so that when the connecting rod 4 is adjusted, the movable collet 2 can move up and down with respect to the bolt 3. The long screw 32 with a washer is inserted through the elongated slotted hole 20 and locked at the end of the bolt 3 to form a movable positioning structure. By screwing the bolt head 31, a tightening or untightening operation can be achieved. When the movable collet 2 is assembled, the mounting hole 120 in the fixed collet 12 is provided for the insertion of a tool to facilitate the locking action of the long screw 32.

The proximal end of the connecting rod 4 is movably riveted to the movable collet 2 by the rivet 5 (or other suitable means) and is provided with a dowel pin 41 which is inserted into the wavy slot 130 on the fixed clamping seat to form the two-point positioning of the connecting rod 4. The end of the dowel pin 41 is provided with the movable washer 411, the diameter of which is larger than the width of the wavy slot 130 to prevent it from escaping the constraints of the wavy slot; in addition, this also prevents it from rocking to and fro.

Figure 3:
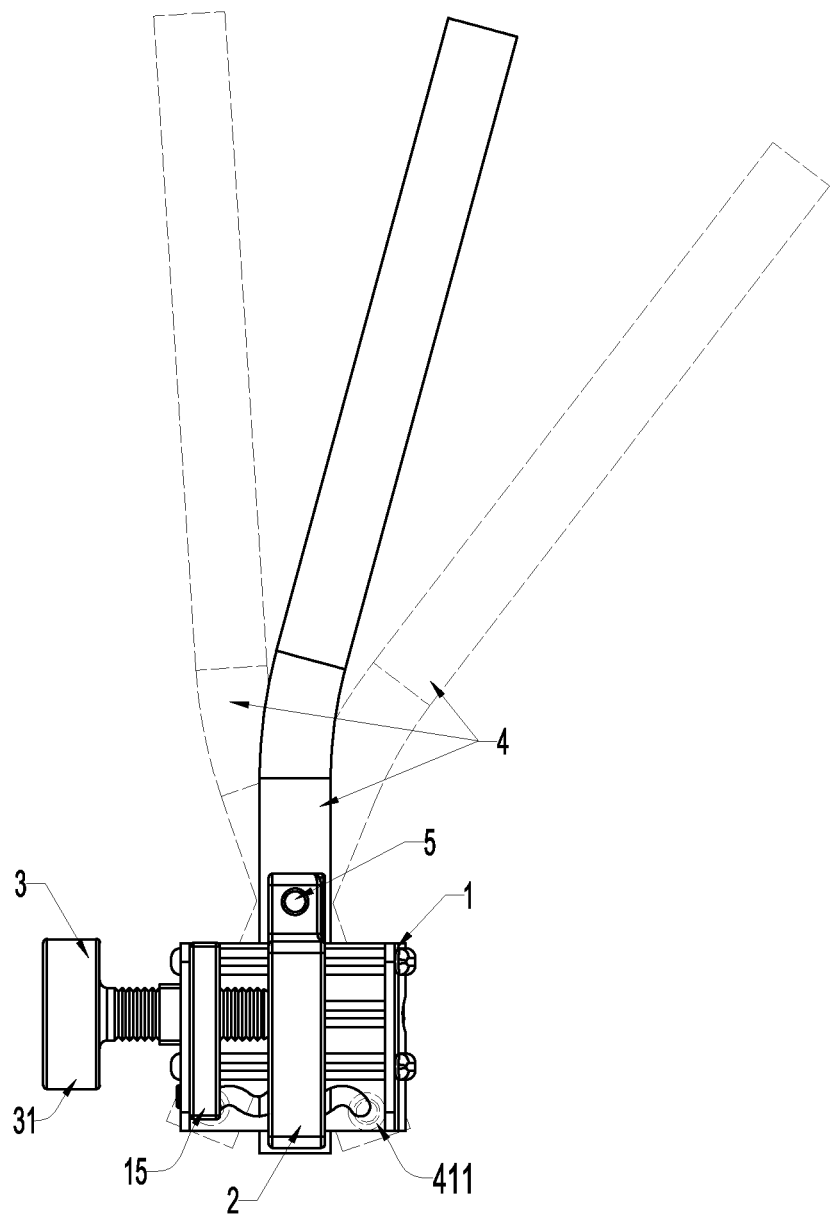
FIG. 3 shows a schematic of angle change in the connecting rod.

As is shown in FIGS. 2 and 3, only one rivet is movably riveted between the connecting rod 4 and the movable collet 2. Thus, the connecting rod 4 can swing about the rivet 5, and the movable collet 2 and the connecting rod 4 together can be appropriately moved up or down with respect to the fixed clamping seat 1 and the bolt 3 such that the connecting rod 4 can swing in a manner that facilitates the dowel pin 41 selection of different valley positions in the wavy slot 130. When the angle of the connecting rod 4 is adjusted, depending on the force direction in which the connecting rod 4 supports the object, the dowel pin 41 can abut against a trough or crest of the wavy slot 130. As shown in the figure, the force direction of the connecting rod 4 is downward, and the dowel pin 41 abuts against a valley of the wavy slot. If the force direction is upward, the dowel pin 41 should abut against a crest of the wavy slot to form the support of the force structure. Locking at such an angle is more reliable. Once the angle of the connecting rod 4 is adjusted in place, the bolt 3 can be tightly locked such that it clamps the object in cooperation with the movable collet 2 and the fixed collet 12. As the position of the movable collect 2 is fixed, the connecting rod 4 is positioned by two points: the rivet 5 and the dowel pin 41. That is, the proper angle of the connecting rod 4 and the positioning of the fixture and the object can be realized synchronously by simply adjusting the bolt 3. This fixture can be widely used in the field of both clamping to lock objects, but also of supporting objects.

We claim:

1. A positioning fixture with a connecting rod, comprising:
    a fixed clamping seat, a movable collet, a bolt and the connecting rod;
    the fixed clamping seat is U-shaped, comprising a bolt seat, a fixed collet and a stroke plate;
    the bolt is threaded secured within the bolt seat; an end of the bolt is positioned between the bolt seat and the fixed collet;
    the movable collet is movably positioned at the end of the bolt and is selectively driven by the bolt to move closer to one end of the fixed collet to selectively tightly clamp on an object;
    wherein,
    the stroke plate on the fixed clamping seat is provided with a wavy slot;
    a proximal end of the connecting rod is movably riveted to the movable collet and is provided with a dowel pin which is inserted into the wavy slot to form a two-point positioning of the connecting rod.

2. The positioning fixture with a connecting rod of claim 1, wherein a main body of the fixed clamping seat is formed by punching a steel plate with enforcing ribs.

3. The positioning fixture with a connecting rod of claim 2, wherein a polygonal hole is formed by punching material out of the bolt seat.

4. The positioning fixture with a connecting rod based on claim 3, wherein the fixed collet features a mounting hole corresponding to the polygonal hole in the bolt seat.

5. The positioning fixture with a connecting rod of claim 3, further including an elongated slotted hole which is positioned between the movable collet and a bolt end part and longer than the width of the wavy slot; a long screw with a washer which passes through the elongated slotted hole and is locked at the end of the bolt to form a movable positioning structure.

6. The positioning fixture with a connecting rod of claim 1, wherein a polygonal hole is provided with a plastic part that has a polygonal boss and an internally threaded hole penetrating the polygonal boss;
    said polygonal boss is embedded in the polygonal hole to form a rotation limit; and the plastic part and the bolt seat are solidly riveted together with a rivet.

7. A positioning fixture with a connecting rod, consisting of:
    a fixed clamping seat, a movable collet, a bolt and the connecting rod;
    the fixed clamping seat is U-shaped, consisting of a bolt seat, a fixed collet and a stroke plate;
    the bolt is threaded secured within the bolt seat; an end of the bolt is positioned between the bolt seat and the fixed collet;
    the movable collet is movably positioned at the end of the bolt and is selectively driven by the bolt to move closer to one end of the fixed collet to selectively tightly clamp on an object;
    wherein,
    the stroke plate on the fixed clamping seat is provided with a wavy slot;
    a proximal end of the connecting rod is movably riveted to the movable collet and is provided with a dowel pin which is inserted into the wavy slot to form a two-point positioning of the connecting rod.

* * * * *